US009809215B2

(12) United States Patent
Lian et al.

(10) Patent No.: US 9,809,215 B2
(45) Date of Patent: Nov. 7, 2017

(54) HYBRID ELECTRIC VEHICLE, DRIVE CONTROL METHOD AND DEVICE OF THE SAME

(71) Applicant: BYD COMPANY LIMITED, Shenzhen, Guangdong (CN)

(72) Inventors: Yubo Lian, Guangdong (CN); Dongsheng Yang, Guangdong (CN); Jintao Zhang, Guangdong (CN); Hongbin Luo, Guangdong (CN)

(73) Assignee: BYD COMPANY LTD., Shenzhen, Guangdong (CN)

( * ) Notice: Subject to any disclaimer, the term of this patent is extended or adjusted under 35 U.S.C. 154(b) by 30 days.

(21) Appl. No.: 15/078,953

(22) Filed: Mar. 23, 2016

(65) Prior Publication Data

US 2016/0280212 A1    Sep. 29, 2016

(30) Foreign Application Priority Data

Mar. 25, 2015   (CN) .......................... 2015 1 0134487

(51) Int. Cl.
| | |
|---|---|
| *B60W 10/06* | (2006.01) |
| *B60W 10/08* | (2006.01) |
| *B60W 20/13* | (2016.01) |
| *B60W 50/00* | (2006.01) |
| *B60W 20/40* | (2016.01) |

(52) U.S. Cl.
CPC ............ *B60W 20/13* (2016.01); *B60W 10/06* (2013.01); *B60W 10/08* (2013.01); *B60W 20/40* (2013.01); *B60W 50/0097* (2013.01); *B60W 2510/10* (2013.01); *B60W 2510/1005* (2013.01); *B60W 2510/244* (2013.01); *B60W 2520/10* (2013.01);

(Continued)

(58) Field of Classification Search
CPC ...... B60W 20/13; B60W 20/40; B60W 10/06; B60W 10/08
USPC ........................................................... 701/22
See application file for complete search history.

(56) References Cited

U.S. PATENT DOCUMENTS

| | | |
|---|---|---|
| 4,313,080 A | 1/1982 | Park |
| 6,371,889 B1 | 4/2002 | Kuroda et al. |

(Continued)

OTHER PUBLICATIONS

Lian, Office Action, U.S. Appl. No. 15/078,942, dated Mar. 9, 2017, 15 pgs.

(Continued)

*Primary Examiner* — Tan Q Nguyen
(74) *Attorney, Agent, or Firm* — Morgan, Lewis & Bockius LLP (57) ABSTRACT

The present disclosure provides a hybrid electric vehicle, a drive control method and a drive control device of a hybrid electric vehicle. The drive control method includes: obtaining a current gear position and a current operating mode of the hybrid electric vehicle, a current electric charge level of a power battery and a slope of a road where the hybrid electric vehicle is; determining whether the hybrid electric vehicle is within a taxiing start-stop interval according to the current gear position of the hybrid electric vehicle, the current electric charge level of the power battery, and the slope of the road; if the hybrid electric vehicle is within the taxiing start-stop interval, further obtaining a current speed of the hybrid electric vehicle; and causing the hybrid electric vehicle to enter a small load stop mode or a small load stall mode according to the current speed.

17 Claims, 7 Drawing Sheets

(52) U.S. Cl.
CPC ... *B60W 2550/142* (2013.01); *B60W 2550/20* (2013.01)

(56) References Cited

U.S. PATENT DOCUMENTS

| | | |
|---|---|---|
| 2007/0112496 A1 | 5/2007 | Ji |
| 2008/0076616 A1 | 3/2008 | Kidokoro et al. |
| 2011/0246013 A1* | 10/2011 | Yee ..................... B60L 11/1859 701/22 |
| 2013/0096749 A1 | 4/2013 | Hussain et al. |
| 2013/0103238 A1 | 4/2013 | Yu et al. |
| 2013/0166118 A1* | 6/2013 | Kim ..................... B60W 10/06 701/22 |

OTHER PUBLICATIONS

Lian, Office Action, U.S. Appl. No. 15/080,332, dated Mar. 10, 2017, 20 pgs.

\* cited by examiner

HYBRID ELECTRIC VEHICLE, DRIVE CONTROL METHOD AND DEVICE OF THE SAME

CROSS REFERENCE TO RELATED APPLICATION

This application claims priority and benefits of Chinese Patent Application No. 201510134487.7, filed with State Intellectual Property Office, P. R. C. on Mar. 25, 2015, the entire content of which application is incorporated herein by reference.

The present application is related to U.S. patent application Ser. No. 15/078,942 entitled "HYBRID ELECTRIC VEHICLE, DRIVE CONTROL METHOD AND DEVICE OF THE SAME" filed Mar. 23, 2016, U.S. patent application Ser No. 15/078,947 entitled "HYBRID ELECTRIC VEHICLE, DRIVE CONTROL METHOD AND DEVICE OF THE SAME" filed Mar. 23, 2016, U.S. patent application Ser. No. 15/078,951 entitled "HYBRID ELECTRIC VEHICLE, DRIVE CONTROL METHOD AND DEVICE OF THE SAME" filed Mar. 23, 2016, U.S. patent application Ser. No. 15/080,326 entitled "HYBRID ELECTRIC VEHICLE, DRIVE CONTROL METHOD AND DEVICE OF THE SAME" filed Mar. 24, 2016, and U.S. patent application Ser. No. 15/080,332 entitled "HYBRID ELECTRIC VEHICLE, DRIVE CONTROL METHOD AND DEVICE OF THE SAME" filed Mar. 24, 2016, all of which are incorporated by reference in their entirety.

TECHNICAL FIELD

The present disclosure relates to vehicle technology field, more particularly to a hybrid electric vehicle, a drive control method and a drive control device of the hybrid electric vehicle.

BACKGROUND

A traditional fuel vehicle is usually equipped with an additional automatic start-stop subsystem for realizing taxiing start-stop control on the vehicle, and thus fuel waste and air pollution caused by engine idling are reduced. There have been following forms of start-stop systems in vehicles.

1. Separating Starter/Generator Start-Stop System

In such a system, the starter and the generator are designed separately, in which the starter is used to provide power for starting an engine, and the generator is used to provide electric energy for the starter. This system includes a high enhanced starter, an enhanced battery (usually an AGM battery), a controllable generator, an engine ECU (Electronic Control Unit) with integrated start-stop coordination program, and a sensor, etc. In this system, the engine is started by the starter separately.

2. Integrated Starter/Generator Start-Stop System

The integrated start/generator is a synchronous machine actuated by a single teeth stator and a rotor in a permanent magnet, and a driving unit may be integrated into a hybrid power transmission system. With this system, the engine may be started by revise driving from the motor.

3. i-Start System

An electric control device is integrated in the generator. The engine stops when the vehicle stops at a red light, and automatically starts as soon as engaging a gear or releasing a brake pedal.

When the vehicle is driven on heavy-traffic roads, the engine will be started frequently, that is a huge test for both a spark plug and a battery. Although the start-stop systems described-above are intelligent enough, a service life of the engine will be shorten as an abrasion on the engine, and a vibration and a noise are inevitable as frequent start-stop, which severely reduces the comfort. In addition, the automatic start-stop system may work only in such conditions that a vehicle speed is 0, a rotating speed of the engine is lower than a prescribed target speed, the refrigerant is in a required range, the vacuum braking meets a required condition, an air conditioner is adjusted suitably, the braking pedal is depressed at a certain gear position (like N or P), and an electric charge level of the power battery meets a next start. Since the start-stop system is limited on many aspects, system units are required to have a high reliability and durability. Moreover, the special start-stop system increases the cost of the vehicle.

SUMMARY

Embodiments of the present disclosure seek to solve at least one of the problems existing in the related art to at least some extent.

According to embodiments of a first aspect of the present disclosure, a drive control method of a hybrid electric vehicle is provided. The method includes: obtaining a current gear position of the hybrid electric vehicle, a current electric charge level of a power battery and a slope of a road on which the hybrid electric vehicle is driving; obtaining a current speed of the hybrid electric vehicle if the current gear position of the hybrid vehicle, the current electric charge level of the power battery, and the slope of the road on which the hybrid electric vehicle is driving meet a preset condition; and causing the hybrid electric vehicle to enter a small load stall mode if the current speed is greater than or equal to a first speed threshold, and less than a second speed threshold.

With the drive control method of the hybrid electric vehicle according to embodiments of the present disclosure, when the current gear position of the hybrid vehicle, the current electric charge level of the power battery, and the slope of the road on which the hybrid electric vehicle is driving meet a preset condition, and the current speed is greater than or equal to a first speed threshold, and less than a second speed threshold, the hybrid electric vehicle is configured to enter a small load stall mode. In this way, a driving distance for the vehicle may be increased, an economy performance may be improved, and fuel consumption and emission may be reduced, without increasing a working frequency of the starter, thus ensuring a working life of components. In addition, if the vehicle has an accelerator-releasing energy feedback function, wasted kinetic energy may be converted to electric energy by a motor through the energy feedback and stored in a power battery, thus increasing energy recovery. Moreover, for the hybrid electric vehicles, problems of bad ride comfort and bad power performance caused by frequent start-stop of the engine may be solved effectively.

According to embodiments of a second aspect of the present disclosure, a drive control device of a hybrid electric vehicle is provided. The device includes: a first obtaining module, configured to obtain a current gear position of the hybrid electric vehicle, a current electric charge level of a power battery and a slope of a road on which the hybrid electric vehicle is driving; a second obtaining module, configured to obtain a current speed of the hybrid electric vehicle, if the current gear position of the hybrid vehicle, the current electric charge level of the power battery, and the slope of the road on which the hybrid electric vehicle is driving meet a preset condition; and a control module, configured to control the hybrid electric vehicle to enter a small load stall mode if the current speed is greater than or equal to a first speed threshold, and less than a second speed threshold.

With the drive control device of the hybrid electric vehicle according to embodiments of the present disclosure, when the current gear position of the hybrid vehicle, the current electric charge level of the power battery, and the slope of the road on which the hybrid electric vehicle is driving meet a preset condition, and the current speed is greater than or equal to a first speed threshold, and less than a second speed threshold, the hybrid electric vehicle is configured to enter a small load stall mode. In this way, a driving distance for the vehicle may be increased, an economy performance may be improved, and fuel consumption and emission may be reduced, without increasing a working frequency of the starter, thus ensuring a working life of components. In addition, if the vehicle has an accelerator-releasing energy feedback function, wasted kinetic energy may be converted to electric energy by a motor through the energy feedback and stored in a power battery, thus increasing energy recovery. Moreover, for the hybrid electric vehicles, problems of bad ride comfort and bad power performance caused by frequent start-stop of the engine may be solved effectively.

According to embodiments of a third aspect of the present disclosure, a hybrid electric vehicle is provided. The hybrid electric vehicle includes the drive control device mentioned in the above embodiments of the second aspect of the present disclosure.

With the hybrid electric vehicle according to embodiments of the present disclosure, when the current gear position of the hybrid vehicle, the current electric charge level of the power battery, and the slope of the road on which the hybrid electric vehicle is driving meet a preset condition, and the current speed is greater than or equal to a first speed threshold, and less than a second speed threshold, the hybrid electric vehicle is configured to enter a small load stall mode. In this way, a driving distance for the vehicle may be increased, an economy performance may be improved, and fuel consumption and emission may be reduced, without increasing a working frequency of the starter, thus ensuring a working life of components. In addition, if the vehicle has an accelerator-releasing energy feedback function, wasted kinetic energy may be converted to electric energy by a motor through the energy feedback and stored in a power battery, thus increasing energy recovery. Moreover, for the hybrid electric vehicles, problems of bad ride comfort and bad power performance caused by frequent start-stop of the engine may be solved effectively.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Example embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure.

A drive control method and device of a hybrid electric vehicle according to embodiments of the present disclosure will be described with reference to drawings.

Figure 1:
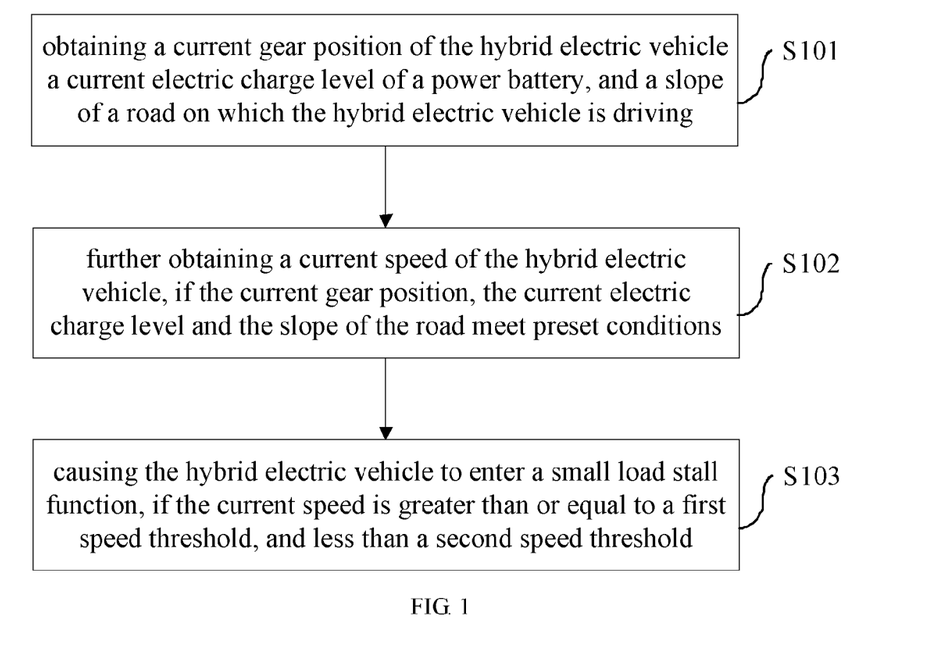
FIG. 1 is a flow chart of a drive control method of a hybrid electric vehicle according to an embodiment of the present disclosure.

FIG. 1 is a flow chart of a drive control method of a hybrid electric vehicle according to an embodiment of the present disclosure.

As shown in FIG. 1, the control drive method according to some embodiments of the present disclosure includes following steps.

In step S101, a current gear position of the hybrid electric vehicle, a current electric charge level of a power battery and a slope of a road on which the hybrid electric vehicle is driving are obtained.

The current gear position may be obtained by a gearbox system of the hybrid electric vehicle through obtaining a gear signal. The current electric charge level of the power battery may be obtained by a BMS (Battery Management System) in the hybrid electric vehicle. The slope of the road may be computed from a longitudinal acceleration of the vehicle, which is obtained by a longitudinal acceleration sensor in the hybrid electric vehicle.

Specifically, the current gear position of the hybrid electric vehicle, the current electric charge level of the power battery and the slope of the road may be obtained via communication between an internal communication network of the hybrid electric vehicle, e.g. CAN (Controller Area Network) and the gearbox system, the BMS and the longitudinal acceleration sensor.

In step S102, a current speed of the hybrid electric vehicle is obtained, if the current gear position of the hybrid electric vehicle, the current electric charge level of the power battery, and the slope of the road on which the hybrid electric vehicle is driving meet the preset condition.

Specifically, if the current gear position of the hybrid electric vehicle, the current electric charge level of the power battery, and the slope of the road on which the hybrid electric vehicle is driving meet a requirement for entering a taxiing start-stop interval, it is determined that the current gear position and the current electric charge level meet the preset condition.

In embodiments of the present disclosure, the drive control method may be performed only when the gear position of the vehicle is at D-position.

When the power battery of the hybrid electric vehicle offers electric energy, a motor can work, and then the vehicle can have the taxiing start-stop function. Thus, the taxiing start-stop control is performed when the electric charge level of the power battery is sufficient.

Since a motor has a limited power output, it is difficult for the motor as an alone driving source to satisfy the power requirement of the vehicle, especially when the vehicle is climbing a sizable slope. Thus, an engine is required to output power when the vehicle is climbing a slope. However, when the vehicle is driving downhill, the driving resistance may be completely overcome by gravity inertia, and thus the required torque is small. In this case, the engine may be configured to stop, a clutch may be released totally, and only the motor may be used to output power. On one hand, the fuel needed during the engine idling is saved, and on the other hand, if the hybrid electric vehicle has the accelerator-releasing energy feedback function, an energy feedback by the motor may be increased, since the clutch is completely released, and a drag force from the engine disappears.

Alternatively, a current operating mode of the hybrid electric vehicle and a discharge power of the power battery may also be obtained, and it may be determined whether the hybrid electric vehicle is within the taxiing start-stop interval according to the current gear position and the current operating mode of the hybrid electric vehicle, the current electric charge level and the discharge power of the power battery, and the slope of the road on which the hybrid electric vehicle is driving.

Specifically, the voltage and the current of the power battery may be obtained via data collectors in the BMS in real time, and then the current electric charge level and the allowable discharge power of the power battery may be computed. When the vehicle is at a low temperature or when the vehicle has a fault, the power battery has a risk of over discharge and over-low voltage. Thus, in order to protect the power battery from damage and prolong a use life of the power battery, the discharge power should be limited when the vehicle is at the low temperature or when the vehicle has a fault. At this time, the vehicle cannot output power normally.

A motor controller may determine a mode of the hybrid electric vehicle according to a mode switch signal, and then choose different driving strategies. Generally, the hybrid electric vehicle includes two working modes (electric mode and hybrid mode, namely EV mode and HEV mode) and two driving modes (Economy mode and Sport mode, namely ECO mode and Sport mode). Therefore, the hybrid electric vehicle may have four kinds of operating modes, such as EV-ECO mode, EV-Sport mode, HEV-ECO mode and HEV-Sport mode. In the EV mode, the vehicle is in a pure electric energy consumption mode and the motor outputs power separately; in the HEV mode, the vehicle is in a hybrid energy consumption mode, and a ratio of power output by the motor to power output by the engine is determined according to a preset strategy. In the ECO mode, the power output from the motor and the engine is limited since the economy is a primary control target; in the Sport mode, the power output from the motor and the engine is not limited since the power performance is the primary control target, especially, in the hybrid sport mode (HEV-Sport mode), the engine remains running.

Figure 2:
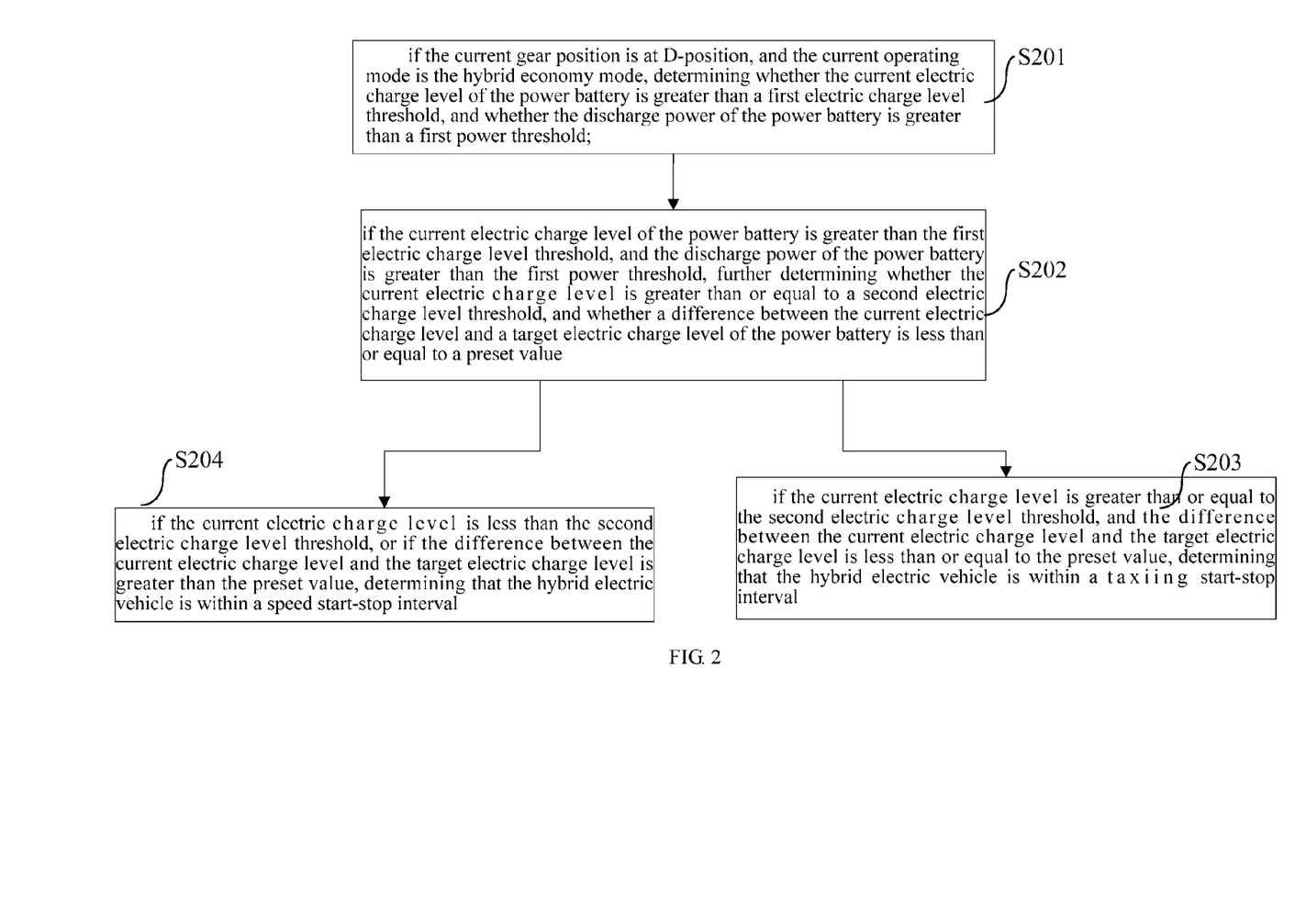
FIG. 2 is a flow chart of determining whether a hybrid electric vehicle is within a taxiing start-stop interval according to an embodiment of the present disclosure.

FIG. 2 is a flow chart of determining whether a hybrid electric vehicle is within a taxiing start-stop interval according to an embodiment of the present disclosure. As shown in FIG. 2, following steps are performed.

In step S201, it is determined whether the current electric charge level of the power battery is greater than a first electric charge level threshold, and whether the discharge power of the power battery is greater than a first power threshold, if the current gear position is at D-position, and the current operating mode is the hybrid economy mode (HEV-ECO mode).

The first electric charge level threshold and the first power threshold may be determined according to a minimum electric charge level and a minimum discharge power at which the power battery may supply power normally. When the electric charge level of the power battery is less than or equal to the first electric charge level threshold or when the discharge power of the power battery is less than or equal to the first power threshold, the power battery may take the risk of over discharging and low voltage alarm. Therefore, in order to protect the power battery from damage and ensure the working life of the power battery, the first electric charge level threshold and the first power threshold should be set.

In step S202, if the current electric charge level of the power battery is greater than the first electric charge level threshold, and the discharge power of the power battery is greater than the first power threshold, it is further determined whether the current electric charge level is greater than or equal to a second electric charge level threshold, and whether a difference between the current electric charge level and a target electric charge level is less than or equal to a preset value.

The target electric charge level is an electric charge level which the power battery finally has when charging or discharging under the HEV mode.

Therefore, if the difference between the current electric charge level and the target electric charge level is less than or equal to the preset value, the current electric charge level of the power battery is relatively high and has a smaller difference with the target electric charge level, and the power battery is in a balance state. In this case, the power battery may not only meet a current driving requirement, but also is in a stable discharge state, and thus over discharging may be avoided effectively when the hybrid electric vehicle enters a small load control function, thereby protecting the power battery, prolonging the working life of the power battery, and keeping a better power performance and stability for the hybrid electric vehicle.

The small load control function refers to a drive control function used when the electric charge level of the power battery is large enough (e.g. the electric charge level is larger than a second electric threshold), the discharge power of the power battery is greater than the first power threshold, and the slope of the road satisfies following conditions: the road is ascent and the slope of the road is less than a first slope threshold; or the road is descent and the slope of the road is greater than or equal to a second slope threshold.

The second electric threshold is an electric charge level which may satisfy the requirement of driving in a pure electric mode at a low speed, such that part of the electric charge level are reserved for driving in a pure electric mode at a low speed when a taxiing start-stop control is performed, thus keeping the better power performance and stability for the hybrid electric vehicle. The first electric threshold and the second electric threshold may be set according to the driving habit of the user and the power consumption of the hybrid electric vehicle.

In step S203, if the current electric charge level is greater than or equal to the second electric charge level threshold, and the difference between the current electric charge level and the target electric charge level is less than or equal to the preset value he hybrid electric vehicle is within the taxiing start-stop interval.

In some embodiments of the present disclosure, the slope of the road may be also combined to determine whether the hybrid electric vehicle is within the taxiing start-stop interval and control the engine. Specifically, if the road is ascent and the slope of the road is less than a first slope threshold, or if the road is descent and the slope of the road is greater than or equal to a second slope threshold, it is determined that the hybrid electric vehicle is within the taxiing start-stop interval.

In one embodiment, when the slope of the road doesn't satisfy the preset condition, if the road is ascent and the slope of the road is greater than or equal to the first slope threshold, then it is executed to quit engine start-stop control, the hybrid vehicle is configured by an engine controller of the hybrid vehicle; and if the road is descent and the slope of the road is less than the second slope threshold, the engine is configured to stop, and the motor is configured to output power separately.

In some embodiments of the present disclosure, step S204 is further included.

In step S204, if the current electric charge level is less than the second electric charge level threshold, or if the difference between the current electric charge level and the target electric charge level is greater than the preset value, it is determined that the hybrid electric vehicle is within a speed start-stop interval.

In the taxiing start-stop interval, the engine is configured to start, stop or stall, while the accelerator pedal is released. In the speed start-stop interval, the engine is configured to start, stop or stall, while the accelerator pedal is depressed. The control strategy for the taxiing start-stop interval needs to consider factors like the speed, the working state of the engine, and the accelerator push depth, while the control strategy for the speed start-stop interval needs to consider factors like the speed and the slope of the road. In other words, in the speed start-stop interval, the engine is configured according to the speed and the slope of the road.

After determining that the hybrid electric vehicle is within the speed start-stop interval, the speed start-stop control may be performed according to the slope of the road and the current speed. Specifically, if the road is ascent and the slope of the road is greater than or equal to a third slope threshold, the engine is started; if the road is descent and the slope of the road is greater than or equal to a fourth slope threshold, the engine is configured to stop, i.e., the fuel supply for the engine is cut off and the clutch is configured to be open (at this time, the engine stops running), and the motor is configured to output power separately; if the road is ascent and the slope of the road is less than the third slope threshold, and the current speed is greater than a fourth speed threshold, the engine is started; if the road is descent and the slope less than the fourth slope threshold, and the current speed is greater than the fourth speed threshold, the engine is started. After starting the engine, the current speed of the hybrid electric vehicle is obtained, and when the current speed of the hybrid electric vehicle is less than a fifth speed threshold, the engine is configured to stop, and the motor is configured to output power separately, and if the current speed of the hybrid electric vehicle is greater than or equal to a fifth speed threshold, then step S101 is executed.

In embodiments of the present disclosure, stopping the engine refers to a state in which fuel supply for the engine is cut off and the clutch is released, stalling the engine refers to a state in which fuel supply for the engine is cut off and the clutch is in a coupling state.

In the present disclosure, the first slope threshold, the second slope threshold, the third slope threshold and the fourth slope threshold may be set according to the driving habit of the user and the power consumption of the hybrid electric vehicle.

In embodiments of the present disclosure, if the current gear position of the hybrid vehicle, the current electric charge level of the power battery, and the slope of the road on which the hybrid electric vehicle is driving meet the preset condition the current speed of the hybrid electric vehicle may be obtained from an ESC (Electrical Speed Controller) via the communication network in the hybrid electric vehicle.

In step S103, the hybrid electric vehicle is configured to enter a small load stall mode if the current speed is greater than or equal to a first speed threshold, and less than a second speed threshold.

Figure 3:
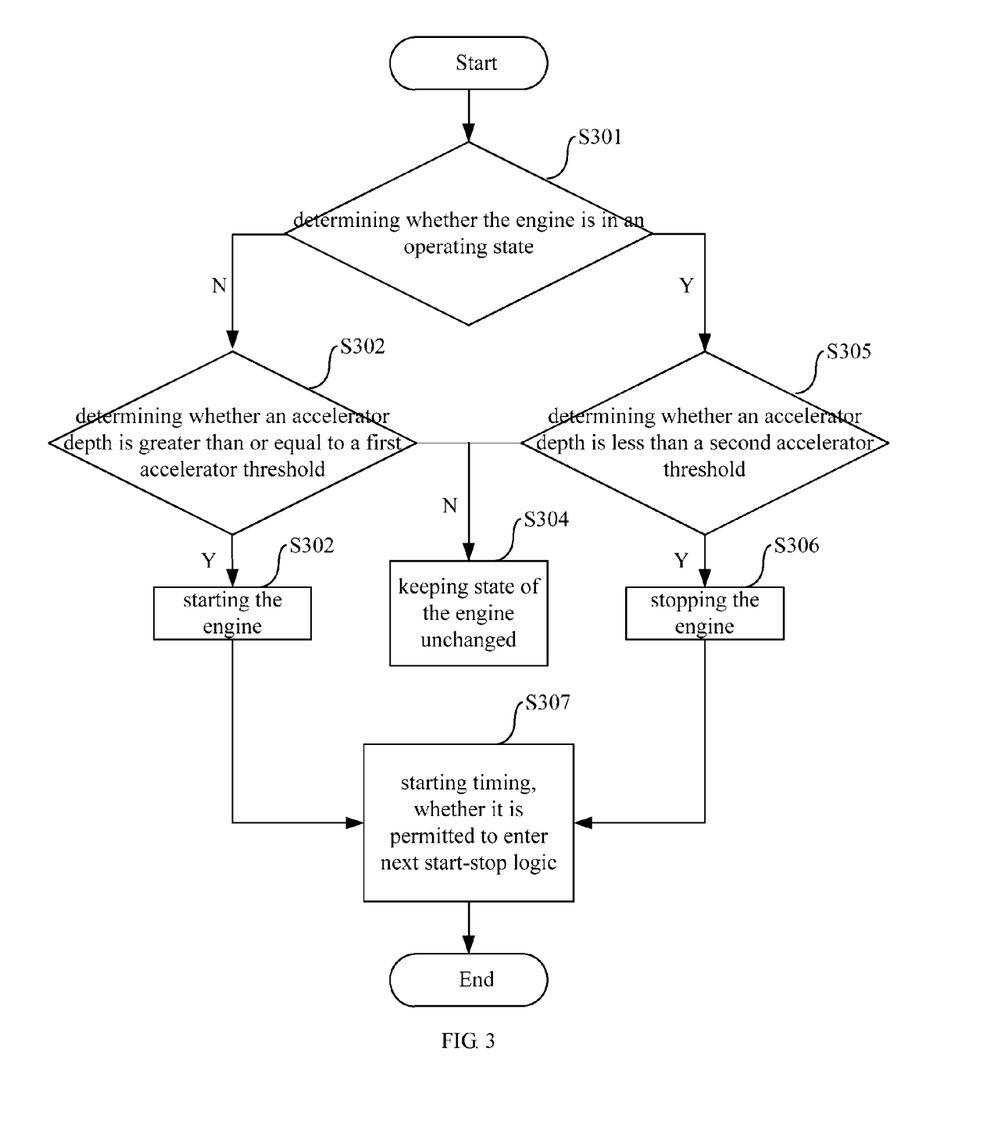
FIG. 3 is a flow chart of controlling a hybrid electric vehicle to enter a small load stall mode according to an embodiment of the present disclosure.

In some embodiments, as shown in FIG. 3, causing the hybrid electric vehicle to enter the small load stall mode includes following steps.

In step S301, it is determined whether the engine is in an operating state; if the engine is not in the operating state, step S302 is executed, if the engine is in the operating state, step S305 is executed.

In step 302, it is determined whether an accelerator push depth is greater than or equal to a first accelerator threshold; if yes, step S303 is executed, if no, step S304 is executed.

In step S303, the engine is configured to start, and step S307 is executed.

In step S304, a state of the engine remains unchanged.

In step S305, it is determined whether the accelerator push depth is less than a second accelerator threshold, if yes, step S306 is executed, if no, step S304 is executed.

In step S306, the engine is configured to stall, a clutch remains in a coupling state and fuel supply for the engine is cut off, and step S307 is executed.

In step S307, timing is started, and next drive control is entered when the timing exceeds a preset time.

Then, after the state of the engine is changed, the state of the engine may be changed again only after the preset time, thus to avoid frequent start-stop of the engine.

The first accelerator threshold and the second accelerator threshold may be set according to the driving habit of the user and the power consumption of the vehicle. The second accelerator threshold is less than the first accelerator threshold, thus avoiding a frequent engine start-stop caused by unclear accelerator thresholds.

In one embodiment, if the current speed is less than the third speed threshold, the engine is configured to stop, and the motor is configured to output power separately. If the current speed is greater than the second speed threshold, the state of the engine remains unchanged. If the current speed is greater than or equal to a third speed threshold, and less than the first speed threshold, the hybrid electric vehicle is configured to enter a small load stop mode.

Specifically, causing the hybrid electric vehicle to enter the small load stop mode includes following steps: it is first determined whether the engine is in an operating state. If the engine is not in the operating state, it is further determined whether an accelerator push depth is greater than or equal to a first accelerator threshold; if the accelerator push depth is greater than or equal to the first accelerator threshold, the engine is configured to start; and if the accelerator push depth is less than the first accelerator threshold, a state of the engine remains unchanged. After the engine is configured to start, timing is started, and when the timing exceeds a preset time, next drive control is entered. And if the engine is in the operating state, it is further determined whether the accelerator push depth is less than a second accelerator threshold; if the accelerator push depth is less than the second accelerator threshold, the engine is configured to stop; if the accelerator push depth is greater than or equal to the second accelerator threshold, the state of the engine remains unchanged. The second accelerator threshold is less than the first accelerator threshold. After he engine is configured to stop, timing is started, and when the timing exceeds a preset time, next drive control is entered. Then, after the state of the engine is changed, the state of the engine may be changed again only after the preset time, thus to avoid frequent start-stop of the engine.

In embodiments of the present disclosure, the second speed threshold is greater than the first speed threshold, and the first speed threshold is greater than the third speed threshold. And the third speed threshold, the third speed threshold, the first speed threshold and the second speed threshold may be set according to the driving habit of the user and the power consumption of the vehicle.

In embodiments of the present disclosure, the vehicle has the accelerator-releasing energy feedback function, and during the accelerator is released, the lost kinetic energy is converted to electric energy via the energy feedback of the motor and stored in the power battery. In this case, if the engine is stopped, the clutch is released totally and the drag force from the engine disappears, then the energy feedback by the motor is increased.

With the drive control method according to embodiments of the present disclosure, the hybrid electric vehicle is configured to enter the small load stall mode when the speed of the hybrid electric vehicle is relatively higher, since in this case, the vehicle motion inertia is large, and the drag force from the engine is relatively small, and thus has a little impact on the feedback charging of the power battery. Furthermore, the clutch keeps the coupling state, such that it does not require coupling the clutch again, thus reducing the friction loss of the clutch. Moreover, the hybrid electric vehicle is configured to enter the small load stop mode when the speed of the hybrid electric vehicle is relatively lower, when the vehicle speed is lower, the clutch is configured to open so as to avoid influence on charging the power battery, since in this case, the vehicle motion inertia is small, and the drag force from the engine is relatively large, which has a great impact on the feedback charging of the power battery.

Figure 4:
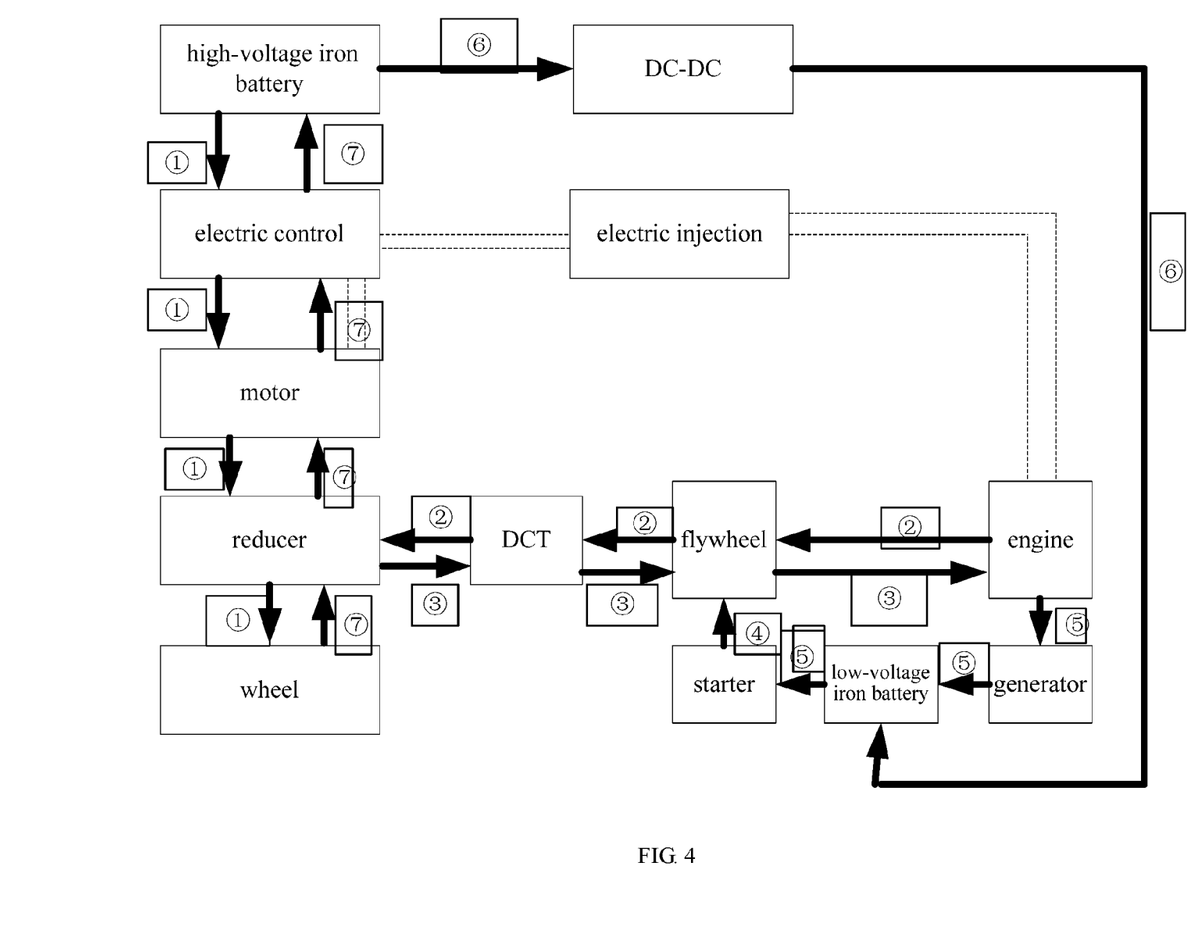
FIG. 4 is a schematic diagram of energy transfer in a drive control process of a hybrid electric vehicle according to an embodiment of the present disclosure.

Specifically, FIG. 4 is a schematic diagram of energy transfer in a drive control process of the hybrid electric vehicle according to an embodiment of the present disclosure. As shown in FIG. 4, when the mode of the hybrid electric vehicle is the hybrid economy mode, the current electric charge level of the power battery (an electric charge level of a high-voltage iron battery) is greater than the second electric charge level threshold, the discharge power is less than or equal to the first power threshold, and the slope of the road, the speed and the accelerator push depth meet a condition for low-speed, small-throttle and low-power driving, the hybrid electric vehicle is driven by the motor separately, and the energy transfer is shown as route ① in FIG. 4. If the discharge power of the hybrid electric vehicle is greater than the second power threshold (i.e. requiring a large power driving), the engine is started to output power, and at this time, the power is transferred to wheels via a DCT (Dual Clutch Transmission) gearbox and a reducer, which is shown as route ② in FIG. 4. Moreover, when the current electric charge level of the hybrid electric vehicle reduces to a certain electric charge level (less than or equal to the second electric charge level threshold), part of power of the engine is output to charge the high-voltage iron battery, the energy transfer of which is shown as route ⑦ in FIG. 4. In addition, when the braking pedal is depressed during the driving, or when the engine automatically stalls and stops running during idling, the motor transfers the kinetic energy of the whole vehicle to the electric energy for storing in the power battery, the energy transfer of which is shown as route ⑦ in FIG. 4.

In embodiments of the present disclosure, the hybrid electric vehicle may include the high-voltage iron battery used as the power battery and a low-voltage iron voltage used as the storage battery.

There are two ways for supplementing the electric charge level of the low-voltage iron battery. The first one is driving the generator to generate electricity when the engine start working, for charging the high-voltage iron battery, the energy transfer of which is shown as route ⑤ in FIG. 4, and the other one is transferring a high voltage in the high-voltage iron battery to a low voltage by a DC-DC converter, for charging the low-voltage iron battery, the energy transfer of which is shown as route ⑥ in FIG. 4.

It can be seen that, in embodiments of the present disclosure, there are two ways for starting the engine. The first one is starting the engine directly by the starter, the energy transfer of which is shown as route ④ in FIG. 4, and the other one is starting the engine via inertia anti-drag force of the whole vehicle when the speed meets a requirement (i.e., the electric charge level of the power battery is large enough, such that the speed reaches the requirement of inertia anti-drag), the energy transfer of which is shown as route ③ in FIG. 4. Thus, if the speed reaches the certain requirement, the starter does not need to work, such that a working frequency of the starter may not be increased, thus ensuring the working life of the components.

Figure 5:
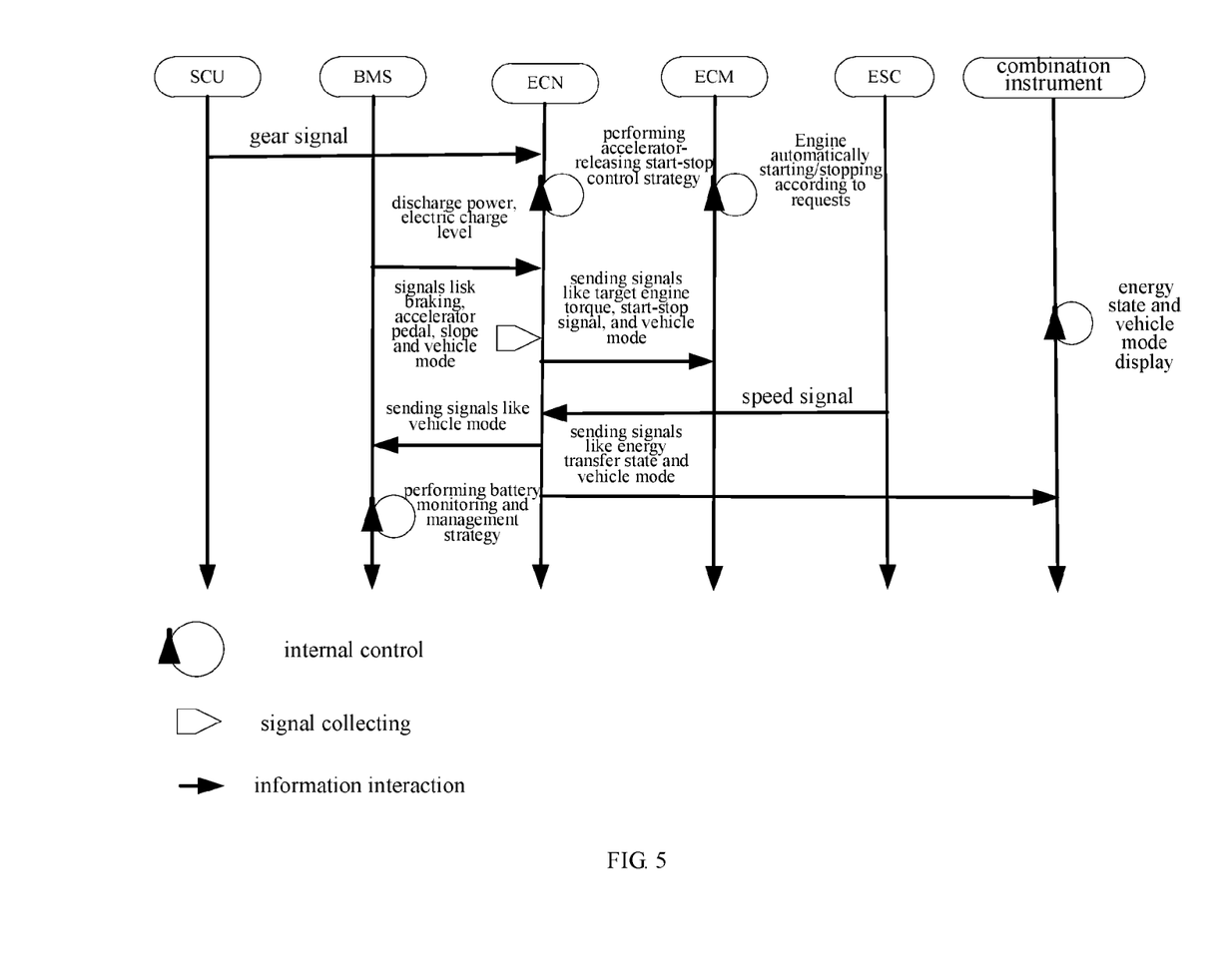
FIG. 5 is a schematic diagram of control information interaction in a drive control process of a hybrid electric vehicle according to an embodiment of the present disclosure.

FIG. 5 is a schematic diagram of control information interaction in the drive control process of the hybrid electric vehicle according to an embodiment of the present disclosure. As shown in FIG. 5, a speed signal is sent from an electronic stability controller (shown as ESC in FIG. 5) to a motor controller (shown as ECN in FIG. 5); a gear controller (shown as SCU in FIG. 5) is used to collect a gear signal and send the gear signal to the ECN; a battery management system (shown as BMS is FIG. 5) is used to collect signals like current output power and current electric charge level and send collected signals to the ECN; the motor controller ECN is used to verify received signals like vehicle mode (such as EV/HEV/ECO/Sport mode) signal, accelerator signal or braking pedal signal, send signals like a target torque of the engine, the vehicle mode, and start-stop identification of the engine to an engine control module ECM, and send signals like the energy transfer state and the vehicle mode to a combination instrument; the BMS performs the battery monitoring and managing strategy; the ECM performs the start-stop control strategy; and the combination instrument performs the energy state and vehicle mode display strategy.

Figure 6:
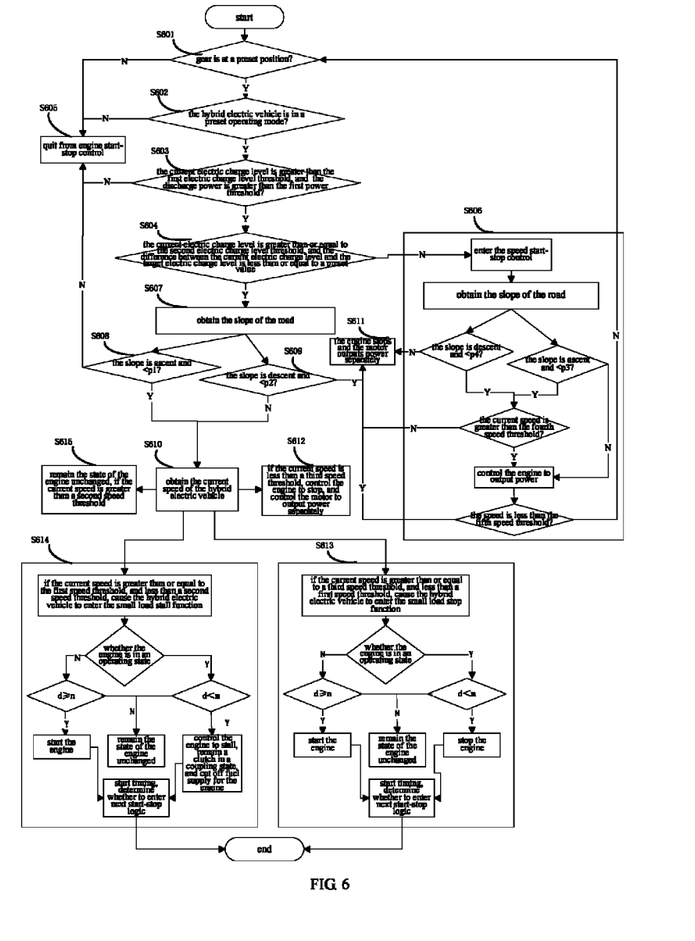
FIG. 6 is a flow chart of a drive control method of a hybrid electric vehicle according to an example embodiment of the present disclosure.

FIG. 6 is a flow chart of a drive control method of a hybrid electric vehicle according to an example embodiment of the present disclosure. As shown in FIG. 6, the drive control method of the hybrid electric vehicle includes following steps.

In step S601, it is determined whether the gear of the hybrid electric vehicle is at a preset position, if yes, step S602 is performed, and if no, step S605 is performed.

The preset position may be D gear position.

In step S602, it is determined whether the hybrid electric vehicle is in a preset operating mode, if yes, step S603 is performed, and if no, step S605 is performed.

The preset operating mode may be the hybrid economy mode.

In step S603, it is determined whether the current electric charge level of the power battery is greater than the first electric charge level threshold, and whether the discharge power of the power battery is greater than the first power threshold, if yes, step S604 is performed, and if no, step S605 is performed.

In step S604, it is determined whether the current electric charge level of the hybrid electric vehicle is greater than or equal to the second electric charge level threshold, and whether the difference between the current electric charge level and the target electric charge level is less than or equal to the preset value, if yes, step S607 is performed, and if no, step S606 is performed.

In step S605, the hybrid electric vehicle quits from the engine start-stop control.

In step S606, the hybrid electric vehicle enters the speed start-stop control.

Specifically, if the road is ascent and the slope of the road is greater than or equal to a third slope threshold (p3), the engine is started, and the engine is configured to output power for the vehicle; if the road is descent and the slope of the road is greater than or equal to a fourth slope threshold (p4), the engine is configured to stop, and the motor is configured to output power separately; if the road is ascent and the slope of the road is less than the third slope threshold (p3), and the current speed is greater than a fourth speed threshold, the engine is started; if the road is descent and the slope of the road is less than the fourth slope threshold (p4), and the current speed is greater than the fourth speed threshold, the engine is started. After starting the engine, it may be further determined whether the current speed of the hybrid electric vehicle is less than a fifth speed threshold, if yes, the engine is configured to stop and the motor is configured to output power separately, and if no, step S601 is returned to, for performing the engine start-stop control procedure again.

In step S607, the slope of the road on which the hybrid electric vehicle is driving obtained, and step S608 and S609 are performed.

In step S608, it is determined whether the road is ascent and the slope of the slope of the road is less than a first slope threshold (p1), if yes, step S610 is performed, and if no, step S605 is performed.

In step S609, it is determined whether the road is descent and the slope of the road is less than a second slope threshold (p2), if yes, step S611 is performed, and if no, step S610 is performed.

In step S610, the current speed of the hybrid electric vehicle is obtained.

In step S611, the engine is configured to stop, and the motor is configured to output power separately.

In step S612, if the current speed is less than a third speed threshold, the engine is configured to stop, and the motor is configured to output power separately.

In step S613, if the current speed is greater than or equal to a third speed threshold, and less than a first speed threshold, the hybrid electric vehicle is configured to enter the small load stop mode.

Specifically, it is first determined whether the engine is in an operating state. If the engine is not in the operating state, it is further determined whether an accelerator push depth (d) is greater than or equal to a first accelerator threshold (n). If the accelerator push depth is greater than or equal to the first accelerator threshold (n), the engine is started; and if the accelerator push depth is less than the first accelerator threshold (n), the state of the engine remains unchanged.

If the engine is in the operating state, it is further determined whether the accelerator push depth is less than a second accelerator threshold (m). If the accelerator push depth is less than the second accelerator threshold (m), the engine is configured to stop; and if the accelerator push depth is greater than or equal to the second accelerator threshold (m), the state of the engine remains unchanged.

The first accelerator threshold and the second accelerator threshold may be set according to a driving habit of a user and a performance of the hybrid electric vehicle.

In step S614, if the current speed is greater than or equal to the first speed threshold, and less than a second speed threshold, the hybrid electric vehicle is configured to enter the small load stall mode.

Specifically, it is first determined whether the engine is in an operating state. If the engine is not in the operating state, it is further determined whether an accelerator push depth (d) is greater than or equal to a first accelerator threshold (n). If the accelerator push depth is greater than or equal to the first accelerator threshold (n), the engine is started; and if the accelerator push depth is less than the first accelerator threshold (n), the state of the engine remains unchanged.

If the engine is in the operating state, it is further determined whether the accelerator push depth is less than a second accelerator threshold (m). If the accelerator push depth is less than the second accelerator threshold (m), the engine is configured to stall, the clutch remains in a coupling state, and fuel supply for the engine is cut off; and if the accelerator push depth is greater than or equal to the second accelerator threshold (m), the state of the engine remains unchanged.

The first accelerator threshold and the second accelerator threshold may be set according to a driving habit of a user and a performance of the hybrid electric vehicle. The second accelerator threshold is less than the first accelerator threshold, thus avoiding a frequent engine start-stop caused by unclear accelerator thresholds.

In step S615, if the current speed is greater than the second speed threshold, the state of the engine remains unchanged.

In the above-described process, when controlling the engine, the motor is in the operating state, such that the motor may provide power for the vehicle separately or provide power for the vehicle along with the engine, according to different working states of the engine.

With the drive control method of the hybrid electric vehicle according to embodiments of the present disclosure, when the current gear position of the hybrid vehicle, the current electric charge level of the power battery, and the slope of the road on which the hybrid electric vehicle is driving meet the preset condition, and the current speed is greater than or equal to a first speed threshold, and less than a second speed threshold, the hybrid electric vehicle is configured to enter a small load stall mode. In this way, a driving distance for the vehicle may be increased, an economy performance may be improved, and fuel consumption and emission may be reduced, without increasing a working frequency of the starter, thus ensuring a working life of components. In addition, if the vehicle has an accelerator-releasing energy feedback function, wasted kinetic energy may be converted to electric energy by a motor through the energy feedback and stored in a power battery, thus increasing energy recovery. Moreover, for the hybrid electric vehicles, problems of bad ride comfort and bad power performance caused by frequent start-stop of the engine may be solved effectively.

A drive control device of a hybrid electric vehicle is also provided in the present disclosure.

Figure 7:
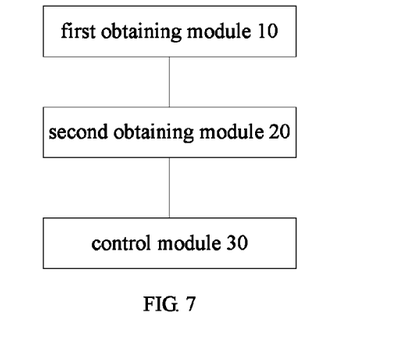
FIG. 7 is a block diagram of a drive control device of a hybrid electric vehicle according to an embodiment of the present disclosure.

FIG. 7 is a block diagram of a drive control device of a hybrid electric vehicle according to an embodiment of the present disclosure.

As shown in FIG. 7, the drive control device according to an embodiment of the present disclosure includes a first obtaining module 10, a second obtaining module 20 and a control module 30.

Specifically, the first obtaining module 10 is configured to obtain a current gear position of the hybrid electric vehicle, a current electric charge level of a power battery and a slope of a road on which the hybrid electric vehicle is driving.

The second obtaining module 20 is configured to obtain a current speed of the hybrid electric vehicle, if the current gear position of the hybrid electric vehicle, the current electric charge level of the power battery and the slope of the road on which the hybrid electric vehicle is driving meet a preset condition.

The control module 30 is configured to control the hybrid electric vehicle to enter a small load stop mode if the current speed is greater than or equal to a first speed threshold, and less than a second speed threshold.

Specifically, the control module 30 may be used for performing those steps shown in FIG. 3.

In some embodiments of the present disclosure, the control module 30 is further configured to: stop the engine and control the motor to output power separately if the current speed is less than the third speed threshold; control the state of the engine to be remained unchanged if the current speed is greater than the second speed threshold, and control the hybrid electric vehicle to enter a small load stop mode if the current speed is greater than or equal to the third speed threshold and less than a first speed threshold.

In embodiments of the present disclosure, the second speed threshold is greater than the first speed threshold, and the first speed threshold is greater than the third speed threshold. The third speed threshold, the third speed threshold, the first speed threshold and the second speed threshold may be set according to the driving habit of the user and the power consumption of the hybrid electric vehicle.

In some embodiments of the present disclosure, the control module is further configured to: control the hybrid electric vehicle to be remained within the taxiing start-stop interval, if the road is ascent and the slope of the road is less than a first slope threshold, or if the road is descent and the slope of the road is greater than or equal to a second slope threshold; control the engine to release from the start-stop control if the road is ascent and the slope is greater than or equal to the first slope threshold; and stop the engine and control the motor to output power separately if the road is descent and the slope of the road is less than the second slope threshold.

In embodiments of the present disclosure, the second speed threshold is greater than the first speed threshold, and the first speed threshold is greater than the third speed threshold. The third speed threshold, the first speed threshold and the second speed threshold may be set according to the driving habit of the user and the power consumption of the hybrid electric vehicle.

Figure 8:
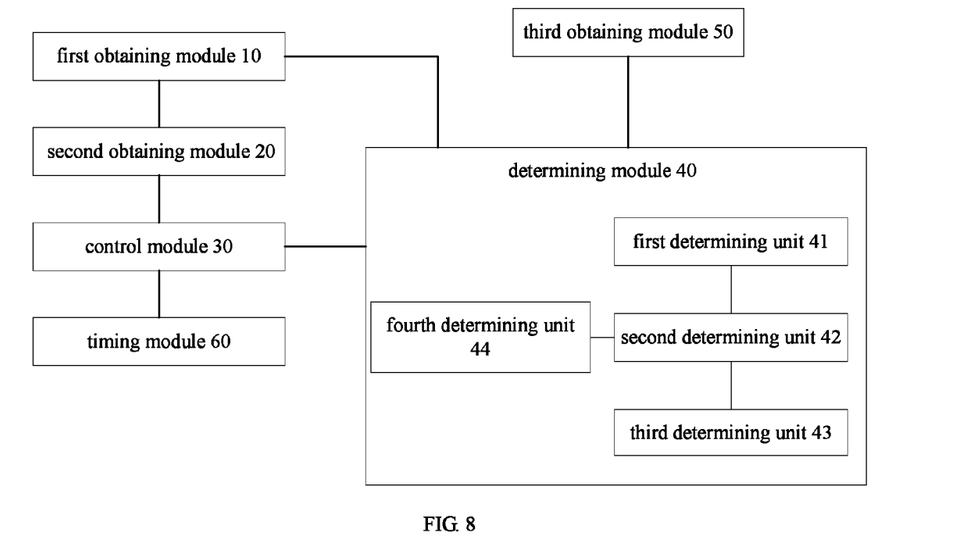
FIG. 8 is a block diagram of a drive control device of a hybrid electric vehicle according to another example embodiment of the present disclosure.

FIG. 8 is a block diagram of a drive control device of a hybrid electric vehicle according to another embodiment of the present disclosure. As shown in FIG. 8, in some embodiments, the drive control device further includes a determining module 40, a third obtaining module 50 and a timing module 60.

The third obtaining module 50 is configured to obtain a current operating mode of the hybrid electric vehicle and a discharge power of the power battery.

The determining module 40 is configured to determine whether the hybrid electric vehicle is within a taxiing start-stop interval according to the current gear position and the current operating mode of the hybrid electric vehicle, the current electric charge level and the discharge power of the power battery, and the slope of the road.

Specifically, as shown in FIG. 8, the determining module further includes: a first determining unit 41, a second determining unit 42 and a third determining unit 43.

The first determining unit 41 is configured to, if the current gear position is at D-position and the current operating mode is at a hybrid economy mode, determines whether the current electric charge level of the power battery is greater than a first electric charge level threshold, and whether the discharge power of the power battery is greater than a first power threshold.

The second determining unit 42 is configured to, if the current electric charge level of the power battery is greater than the first electric charge level threshold, and the discharge power of the power battery is greater than the first power threshold, determine whether the current electric charge level is greater than or equal to a second electric charge level threshold, and whether a difference between the current electric charge level and a target electric charge level is less than or equal to a preset value.

The third determining unit 43 is configured to, if the current electric charge level is greater than or equal to the second electric charge level threshold, and the difference between the current electric charge level and the target electric charge level is less than or equal to the preset value, determine that the hybrid electric vehicle is within the taxiing start-stop interval.

Alternatively, the determining module may further include a fifth determining unit 44 configured to, if the current electric charge level of the power battery is less than the second electric charge level threshold, or the difference between the current electric charge level and the target electric charge level is greater than the preset value, determine the hybrid vehicle is within the speed start-stop interval.

The timing module 60 is configured to, after the engine is configured to start, or stop according to the accelerator push depth, start timing, and when the timing exceeds a preset time, next drive control is entered.

With respect to the devices in the above embodiments, the specific operation modes of individual modules therein have been described in detail in the embodiments regarding the drive control method of the hybrid electric vehicle, which will not be elaborated herein.

The energy transfer in a drive control process of a hybrid electric vehicle according to an embodiment of the present disclosure may be shown in FIG. 4, and the information interaction in a drive control process of a hybrid electric vehicle according to an embodiment of the present disclosure may be shown in FIG. 5

With the drive control device of the hybrid electric vehicle according to embodiments of the present disclosure, when the current gear position of the hybrid vehicle, the current electric charge level of the power battery, and the slope of the road on which the hybrid electric vehicle is driving meet a preset condition, and the current speed is greater than or equal to a first speed threshold, and less than a second speed threshold, the hybrid electric vehicle is configured to enter a small load stall mode. In this way, a driving distance for the vehicle may be increased, an economy performance may be improved, and fuel consumption and emission may be reduced, without increasing a working frequency of the starter, thus ensuring a working life of components. In addition, if the vehicle has an accelerator-releasing energy feedback function, wasted kinetic energy may be converted to electric energy by a motor through the energy feedback and stored in a power battery, thus increasing energy recovery. Moreover, for the hybrid electric vehicles, problems of bad ride comfort and bad power performance caused by frequent start-stop of the engine may be solved effectively.

In some embodiments, a hybrid electric vehicle is also provided in the present disclosure. The hybrid electric vehicle includes the drive control device described in any of above embodiments.

With the hybrid electric vehicle according to embodiments of the present disclosure, when the current gear position of the hybrid vehicle, the current electric charge level of the power battery, and the slope of the road on which the hybrid electric vehicle is driving meet a preset condition, and the current speed is greater than or equal to a first speed threshold, and less than a second speed threshold, the hybrid electric vehicle is configured to enter a small load stall mode. In this way, a driving distance for the vehicle may be increased, an economy performance may be improved, and fuel consumption and emission may be reduced, without increasing a working frequency of the starter, thus ensuring a working life of components. In addition, if the vehicle has an accelerator-releasing energy feedback function, wasted kinetic energy may be converted to electric energy by a motor through the energy feedback and stored in a power battery, thus increasing energy recovery. Moreover, for the hybrid electric vehicles, problems of bad ride comfort and bad power performance caused by frequent start-stop of the engine may be solved effectively.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top" of the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A drive control method of a hybrid electric vehicle, comprising:
   obtaining a current gear position of the hybrid electric vehicle, a current electric charge level of a power battery and a slope of a road on which the hybrid electric vehicle is driving;
   obtaining a current speed of the hybrid electric vehicle if the current gear position of the hybrid vehicle, the current electric charge level of the power battery, and the slope of the road on which the hybrid electric vehicle is driving meet a preset condition; and
   causing the hybrid electric vehicle to enter a small load stall mode if the current speed is greater than or equal to a first speed threshold, and less than a second speed threshold.

2. The drive control method according to claim 1, wherein causing the hybrid electric vehicle to enter the small load stall mode comprises:
   determining whether the engine is in an operating state;
   if the engine is not in the operating state, further determining whether an accelerator push depth is greater than or equal to a first accelerator threshold;
   if the accelerator push depth is greater than or equal to the first accelerator threshold, starting the engine; and if the accelerator push depth is less than the first accelerator threshold, keeping a state of the engine unchanged.

3. The drive control method according to claim 2, further comprising:
if the engine is in the operating state, further determining whether the accelerator push depth is less than a second accelerator threshold;
if the accelerator push depth is less than the second accelerator threshold, stalling the engine, keeping a clutch in a coupling state and terminating fuel supply for the engine; and
if the accelerator push depth is greater than or equal to the second accelerator threshold, keeping the state of the engine unchanged.

4. The drive control method according to claim 2, after starting the engine, or stopping according to the accelerator push depth, further comprising:
starting timing, and
entering next drive control when the timing exceeds a preset time.

5. The drive control method according to claim 1, further comprising:
obtaining a current operating mode of the hybrid electric vehicle and a discharge power of the power battery; and
determining whether the hybrid electric vehicle is within a taxiing start-stop interval according to the current gear position and the current operating mode of the hybrid electric vehicle, the current electric charge level and the discharge power of the power battery, and the slope of the road on which the hybrid electric vehicle is driving.

6. The drive control method according to claim 5, wherein determining whether the hybrid electric vehicle is within the taxiing start-stop interval according to the current gear position and the current operating mode of the hybrid electric vehicle, the current electric charge level and the discharge power of the power battery, and the slope of the road on which the hybrid electric vehicle is driving comprises:
if the current gear position is at D-position and the current operating mode is at a hybrid economy mode, further determining whether the current electric charge level of the power battery is greater than a first electric charge level threshold, and whether the discharge power of the power battery is greater than a first power threshold;
if the current electric charge level of the power battery is greater than the first electric charge level threshold, and the discharge power of the power battery is greater than the first power threshold, further determining whether the current electric charge level is greater than or equal to a second electric charge level threshold, and whether a difference between the current electric charge level and a target electric charge level is less than or equal to a preset value; and
if the current electric charge level is greater than or equal to the second electric charge level threshold, and the difference between the current electric charge level and the target electric charge level is less than or equal to the preset value, determining that the hybrid electric vehicle is within the taxiing start-stop interval.

7. The drive control method according to claim 6, further comprising:
if the road is ascent and the slope of the road is less than a first slope threshold, or if the road is descent and the slope of the road is greater than or equal to a second slope threshold, keeping the hybrid electric vehicle within the taxiing start-stop interval;
if the road is ascent and the slope of the road is greater than or equal to the first slope threshold, releasing a start-stop control on an engine; and
if the road is descent and the slope of the road is less than the second slope threshold, stopping the engine, and controlling a motor to output power separately.

8. The drive control method according to claim 1, further comprising:
stopping the engine and controlling the motor to output power separately, if the current speed is less than a third speed threshold;
causing the hybrid electric vehicle to enter a small load stop mode, if the current speed is greater than or equal to the third speed threshold and less than the first speed threshold; and
keeping a state of the engine unchanged, if the current speed is greater than the second speed threshold.

9. A drive control device of a hybrid electric vehicle, comprising:
a first obtaining module, configured to obtain a current gear position of the hybrid electric vehicle, a current electric charge level of a power battery and a slope of a road on which the hybrid electric vehicle is driving;
a second obtaining module, configured to obtain a current speed of the hybrid electric vehicle, if the current gear position of the hybrid vehicle, the current electric charge level of the power battery, and the slope of the road on which the hybrid electric vehicle is driving meet a preset condition; and
a control module, configured to control the hybrid electric vehicle to enter a small load stall mode if the current speed is greater than or equal to a first speed threshold, and less than a second speed threshold.

10. The drive control device according to claim 9, wherein the control module is configured to:
determine whether the engine is in an operating state;
if the engine is not in the operating state, further determine whether an accelerator push depth is greater than or equal to a first accelerator threshold;
if the accelerator push depth is greater than or equal to the first accelerator threshold, start the engine; and
if the accelerator push depth is less than the first accelerator threshold, keep a state of the engine unchanged.

11. The drive control device according to claim 10, wherein the control module is further configured to:
if the engine is in the operating state, further determine whether the accelerator push depth is less than a second accelerator threshold;
if the accelerator push depth is less than the second accelerator threshold, stall the engine, keep a clutch in a coupling state and terminate fuel supply for the engine; and
if the accelerator push depth is greater than or equal to the second accelerator threshold, keep the state of the engine unchanged.

12. The drive control device according to claim 10, further comprising:
a timing module, configured to start timing and enter next drive control when the timing exceeds a preset time, after the engine to is configured to start, or stop according to the accelerator push depth.

13. The drive control device according to claim 9, further comprising:

a third obtaining module, configured to obtain a current operating mode of the hybrid electric vehicle and a discharge power of the power battery; and a determining module, configured to determine whether the hybrid electric vehicle is within a taxiing start-stop interval according to the current gear position and the current operating mode of the hybrid electric vehicle, the current electric charge level and the discharge power of the power battery, and the slope of the road on which the hybrid electric vehicle is driving.

14. The drive control device according to claim 13, wherein the determining module comprises:

a first determining unit, configured to, if the current gear position is at D-position and the current operating mode is at a hybrid economy mode, determine whether the current electric charge level of the power battery is greater than a first electric charge level threshold, and whether the discharge power of the power battery is greater than a first power threshold;

a second determining unit, configured to, if the current electric charge level of the power battery is greater than the first electric charge level threshold, and the discharge power of the power battery is greater than the first power threshold, determine whether the current electric charge level is greater than or equal to a second electric charge level threshold, and whether a difference between the current electric charge level and a target electric charge level is less than or equal to a preset value; and a third determining unit, configured to, if the current electric charge level is greater than or equal to the second electric charge level threshold, and the difference between the current electric charge level and the target electric charge level is less than or equal to the preset value, determine that the hybrid electric vehicle is within the taxiing start-stop interval.

15. The drive control device according to claim 14, wherein the control module is further configured to:

keep the hybrid electric vehicle within the taxiing start-stop interval, if the road is ascent and the slope of the road is less than a first slope threshold, or if the road is descent and the slope of the road is greater than or equal to a second slope threshold;

release a start-stop control on an engine, if the road is ascent and the slope of the road is greater than or equal to the first slope threshold; and stop the engine, and control a motor to output power separately, if the road is descent and the slope is less than the second slope threshold.

16. The drive control device according to claim 9, wherein the control module is further configured to:

stop the engine and control the motor to output power separately, if the current speed is less than a third speed threshold;

cause the hybrid vehicle to enter a small load stall mode, if the current speed is greater than or equal to the first speed threshold and less than a second speed threshold; and keep a state of the engine unchanged, if the current speed is greater than the second speed threshold.

17. A hybrid electric vehicle, comprising the drive control device according to claim 9.

* * * * *